US010731857B2

(12) United States Patent
Burd (10) Patent No.: US 10,731,857 B2
(45) Date of Patent: Aug. 4, 2020

(54) FILM COOLING CIRCUIT FOR A COMBUSTOR LINER

(71) Applicant: United Technologies Corporation, Hartford, CT (US)

(72) Inventor: Steven W. Burd, Cheshire, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1051 days.

(21) Appl. No.: 14/843,578

(22) Filed: Sep. 2, 2015

(65) Prior Publication Data

US 2016/0069569 A1 Mar. 10, 2016

Related U.S. Application Data

(60) Provisional application No. 62/048,055, filed on Sep. 9, 2014.

(51) Int. Cl.
*F23R 3/06* (2006.01)
*F23R 3/00* (2006.01)

(52) U.S. Cl.
CPC .............. *F23R 3/06* (2013.01); *F23R 3/002* (2013.01); *F05D 2230/13* (2013.01); *F05D 2230/30* (2013.01); *F05D 2230/90* (2013.01); *F05D 2260/202* (2013.01); *F23R 2900/00018* (2013.01); *F23R 2900/03041* (2013.01); *F23R 2900/03042* (2013.01); *F23R 2900/03043* (2013.01); *Y02T 50/675* (2013.01); *Y02T 50/6765* (2018.05)

(58) Field of Classification Search
CPC .... F23R 3/002; F23R 3/06; F23R 3/16; F23R 3/44; F23R 2900/03041; F23R 2900/03042; F23R 2900/03043; F23R 2900/00018; F02C 7/12; F05D 2260/202; F05D 2260/22141; F01D 25/12; F01D 5/288; F05B 2230/90
See application file for complete search history.

(56) References Cited

U.S. PATENT DOCUMENTS

| 3,741,824 A | * | 6/1973 | Duvall | ...................... C22F 1/10 148/527 |
| 5,130,163 A | | 7/1992 | Clingman et al. | |

(Continued)

OTHER PUBLICATIONS

EP search report for EP 15183924.8 dated Jan. 18, 2016.

*Primary Examiner* — Gerald L Sung
*Assistant Examiner* — Marc J Amar
(74) *Attorney, Agent, or Firm* — Getz Balich LLC (57) ABSTRACT

A liner of a combustor wall assembly generally defines a combustion chamber and includes a film cooling circuit having a channel communicating through a hot face of a substrate of the liner. An aperture of the circuit is defined by the substrate, extends through the cold face and is in fluid communication with the channel. The hot face of the substrate is covered with a coating that extends over and thus defines in-part the channel. A film cooling hole extends through the coating and is in fluid communication with the channel. A method of manufacturing the circuit includes casting the substrate with the aperture and hole; then placing an insert into the channel prior to application of the coating over the substrate and insert. The insert is then removed and the film cooling hole is formed through the coating.

12 Claims, 6 Drawing Sheets

(56) References Cited

U.S. PATENT DOCUMENTS

| | | | |
|---|---|---|---|
| 5,419,681 A * | 5/1995 | Lee | F01D 5/186 415/115 |
| 5,421,158 A * | 6/1995 | Stenger | F23R 3/34 60/747 |
| 6,402,470 B1 * | 6/2002 | Kvasnak | F01D 5/187 415/115 |
| 6,896,487 B2 * | 5/2005 | Cunha | F01D 5/186 415/115 |
| 7,270,175 B2 | 9/2007 | Mayer et al. | |
| 7,413,808 B2 | 8/2008 | Burd et al. | |
| 7,464,554 B2 | 12/2008 | Cheung et al. | |
| 8,216,687 B2 | 7/2012 | Burd et al. | |
| 8,359,865 B2 | 1/2013 | Dierberger et al. | |
| 8,359,866 B2 | 1/2013 | Dierberger et al. | |
| 8,475,945 B2 | 7/2013 | Schmidt et al. | |
| 8,683,814 B2 | 4/2014 | Xu | |
| 8,753,071 B2 * | 6/2014 | Bunker | F01D 5/187 415/115 |
| 8,978,385 B2 | 3/2015 | Cunha | |
| 9,021,675 B2 | 5/2015 | Rose | |
| 9,057,523 B2 | 6/2015 | Cunha et al. | |
| 9,194,585 B2 | 11/2015 | Cunha et al. | |
| 9,476,306 B2 * | 10/2016 | Bunker | F01D 5/187 |
| 2001/0001897 A1 | 5/2001 | Zhao et al. | |
| 2004/0123598 A1 | 7/2004 | Ackermann et al. | |
| 2005/0086940 A1 * | 4/2005 | Coughlan, III | F23R 3/002 60/752 |
| 2006/0016191 A1 * | 1/2006 | Woodcock | C23C 4/18 60/754 |
| 2006/0207095 A1 * | 9/2006 | Kuhn | F23R 3/002 29/890.01 |
| 2007/0048144 A1 * | 3/2007 | Morrison | C04B 41/009 416/224 |
| 2007/0116972 A1 * | 5/2007 | Persky | C23C 16/403 428/457 |
| 2012/0036858 A1 * | 2/2012 | Lacy | F23R 3/002 60/754 |
| 2012/0114868 A1 * | 5/2012 | Bunker | B23P 15/04 427/448 |
| 2012/0124832 A1 * | 5/2012 | Bunker | F01D 5/147 29/888 |
| 2012/0163984 A1 * | 6/2012 | Bunker | F01D 5/187 416/241 B |
| 2012/0276308 A1 | 11/2012 | Rebak et al. | |
| 2013/0025287 A1 * | 1/2013 | Cunha | F23R 3/002 60/772 |
| 2013/0025288 A1 * | 1/2013 | Cunha | F23R 3/002 60/772 |
| 2013/0101761 A1 | 4/2013 | Bunker et al. | |
| 2013/0327057 A1 * | 12/2013 | Cunha | F23R 3/002 60/782 |
| 2014/0096528 A1 * | 4/2014 | Cunha | F02C 7/18 60/755 |
| 2014/0283520 A1 * | 9/2014 | McMahan | F01D 9/023 60/752 |
| 2015/0143792 A1 * | 5/2015 | Bunker | F01D 5/187 60/39.83 |
| 2016/0131364 A1 * | 5/2016 | Burd | B23P 15/00 60/752 |
| 2016/0281204 A1 * | 9/2016 | Ucasz | C23C 4/02 |
| 2018/0119270 A1 * | 5/2018 | Hoel | C23C 4/18 |

* cited by examiner

FILM COOLING CIRCUIT FOR A COMBUSTOR LINER

This application claims priority to U.S. Patent Appln. No. 62/048,055 filed Sep. 9, 2014.

BACKGROUND

The present disclosure relates to a gas turbine engine and, more particularly, to a combustor liner having film cooling circuits.

Gas turbine engines, such as those that power modem commercial and military aircraft, include a fan section to propel the aircraft, compressor section to pressurize a supply of air from the fan section, a combustor section to burn a hydrocarbon fuel in the presence of the pressurized air, and a turbine section to extract energy from the resultant combustion gases and generate thrust.

The combustor section may have an annular wall having inner and outer shells that support respective inner and outer heat shielding liners. The liners may be comprised of a plurality of floating heat shields or panels that together define an annular combustion chamber. An annular cooling plenum is defined between the respective shells and liners for supplying cooling air to an opposite hot side of the panels through a plurality of strategically placed film cooling holes. The film cooling holes are generally orientated to create a protective blanket, or, air film over the hot side of the panels, thereby protecting the panels from the hot combustion gases in the chamber.

Unfortunately, placing and/or distributing known film cooling holes across the panel to achieve an even temperature distribution is difficult. This difficulty is further aggravated due to structural obstacles and/or panel features that disrupt the formation of the cooling air film. Uneven temperature distributions or panel hotspots create thermal mechanical stresses that lead to cracking and a shortened panel lifespan.

SUMMARY

A combustor liner defining a combustion chamber and according to one, non-limiting, embodiment of the present disclosure includes a substrate having a hot face and an opposite cold face with a channel communicating through the hot face and an aperture in fluid communication with the channel and extending through the cold face; and a coating disposed over the hot face and defining in-part the channel with a hole in the coating and in fluid communication between the combustion chamber and the channel.

Additionally to the foregoing embodiment, the coating includes a bond coat in contact with the hot face and defining in-part the channel.

In the alternative or additionally thereto, in the foregoing embodiment, the coat includes a thermal barrier coat covering the bond coat, and the hole communicates through the bond coat and the thermal barrier coat.

In the alternative or additionally thereto, in the foregoing embodiment, the hole is a film cooling hole.

In the alternative or additionally thereto, in the foregoing embodiment, a direction of flow through the aperture is substantially normal to a direction of flow through the channel.

In the alternative or additionally thereto, in the foregoing embodiment, the direction of flow through the channel is substantially planar to the substrate and angled with a direction of flow through the hole.

In the alternative or additionally thereto, in the foregoing embodiment, the hole is one of a plurality of holes.

In the alternative or additionally thereto, in the foregoing embodiment, the channel is defined by a surface of the substrate that substantially faces the combustion chamber and a peripheral side of the substrate that surrounds the bottom surface and spans between the bottom surface and the coating.

In the alternative or additionally thereto, in the foregoing embodiment, the aperture communicates through the surface.

In the alternative or additionally thereto, in the foregoing embodiment, the liner includes a pedestal in the channel and extending between and engaged to the surface and the coating.

A combustor wall assembly according to another, non-limiting, embodiment includes a liner defining at least in-part a combustion chamber; a shell with a cooling cavity defined between the liner and the shell; and a film cooling circuit extending through the liner and communicating between the cavity and the combustion chamber.

Additionally to the foregoing embodiment, the liner has a substrate having a first face defining in-part the cooling cavity and an opposite second face, and a coating covering the second face and defining the combustion chamber.

In the alternative or additionally thereto, in the foregoing embodiment, the film cooling circuit has a channel generally in the substrate and defined by the substrate and the coating, an aperture defined by the substrate and in fluid communication between the cooling cavity and the channel, and at least one film hole in the coating and in fluid communication between the channel and the combustion chamber.

In the alternative or additionally thereto, in the foregoing embodiment, cooling air flow is diverted from the aperture and to the channel, and is diverted from the channel and to the hole.

In the alternative or additionally thereto, in the foregoing embodiment, the assembly includes a pedestal in the channel and spanning between the coating and the substrate.

In the alternative or additionally thereto, in the foregoing embodiment, the coating has a first coat secured to the substrate and a thermal barrier coat secured to the first coat and exposed to the combustion chamber.

In the alternative or additionally thereto, in the foregoing embodiment, the hole is a laser drilled hole and extends through the first coat and the thermal barrier coat.

A method of manufacturing a film cooling circuit for a combustor according to another, non-limiting, embodiment includes the steps of casting a substrate of a panel with a channel of the circuit; placing an insert into the channel; securing a coating over the substrate and the insert; removing the insert; and forming a film hole through the coating that is in fluid communication with the channel.

Additionally to the foregoing embodiment, the casted substrate has an aperture in fluid communication with the channel and the insert is removed through the aperture.

In the alternative or additionally thereto, in the foregoing embodiment, the step of securing a coating includes securing a first coat over the substrate and insert then securing a thermal barrier coat over the first coat.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
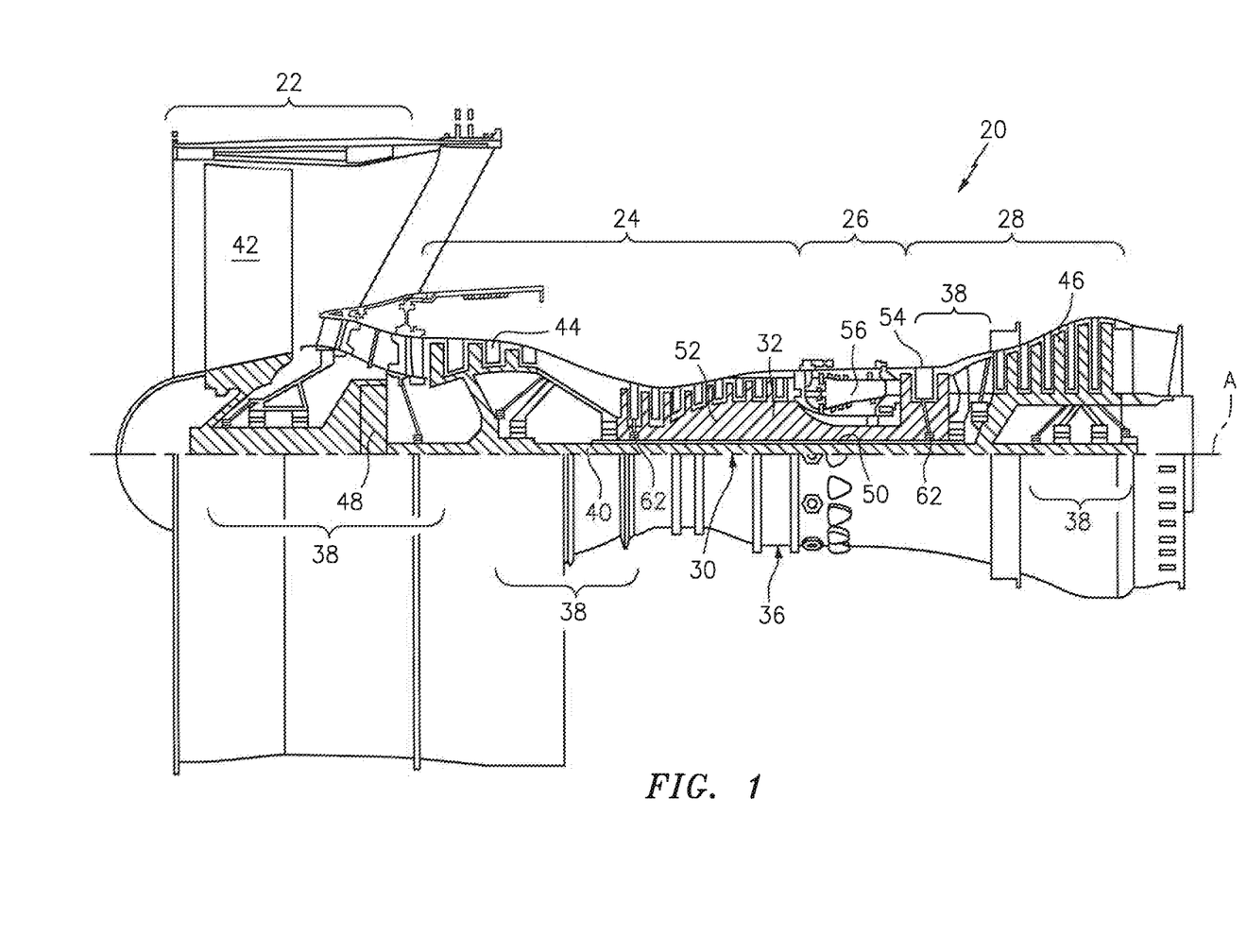
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an Intermediate Pressure Turbine ("IPT") between the High Pressure Turbine ("HPT") and the Low Pressure Turbine ("LPT").

The engine 20 generally includes a low spool 30 and a high spool 32 mounted for rotation about an engine central longitudinal axis A relative to an engine static structure 36 or engine case via several bearing structures 38. The low spool 30 generally includes an inner shaft 40 that interconnects a fan 42 of the fan section 22, a LPC 44 of the compressor section 24 and a LPT 46 of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a HPC 52 of the compressor section 24 and HPT 54 of the turbine section 28. A combustor 56 of the combustor section 26 is arranged between the HPC 52 and the HPT 54. The inner shaft 40 and the outer shaft 50 are concentric and rotate about the engine central longitudinal axis A that is collinear with their longitudinal axes. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood; however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane System. The low Fan Pressure Ratio according to one, non-limiting, embodiment of the example gas turbine engine 20 is less than 1.45. Low Corrected Fan Tip Speed is the actual fan tip speed divided by an industry standard temperature correction of ("T"/518.7)$^{0.5}$ in which "T" represents the ambient temperature in degrees Rankine. The Low Corrected Fan Tip Speed according to one non-limiting embodiment of the example gas turbine engine 20 is less than about 1,150 feet per second (351 meters per second).

Figure 2:
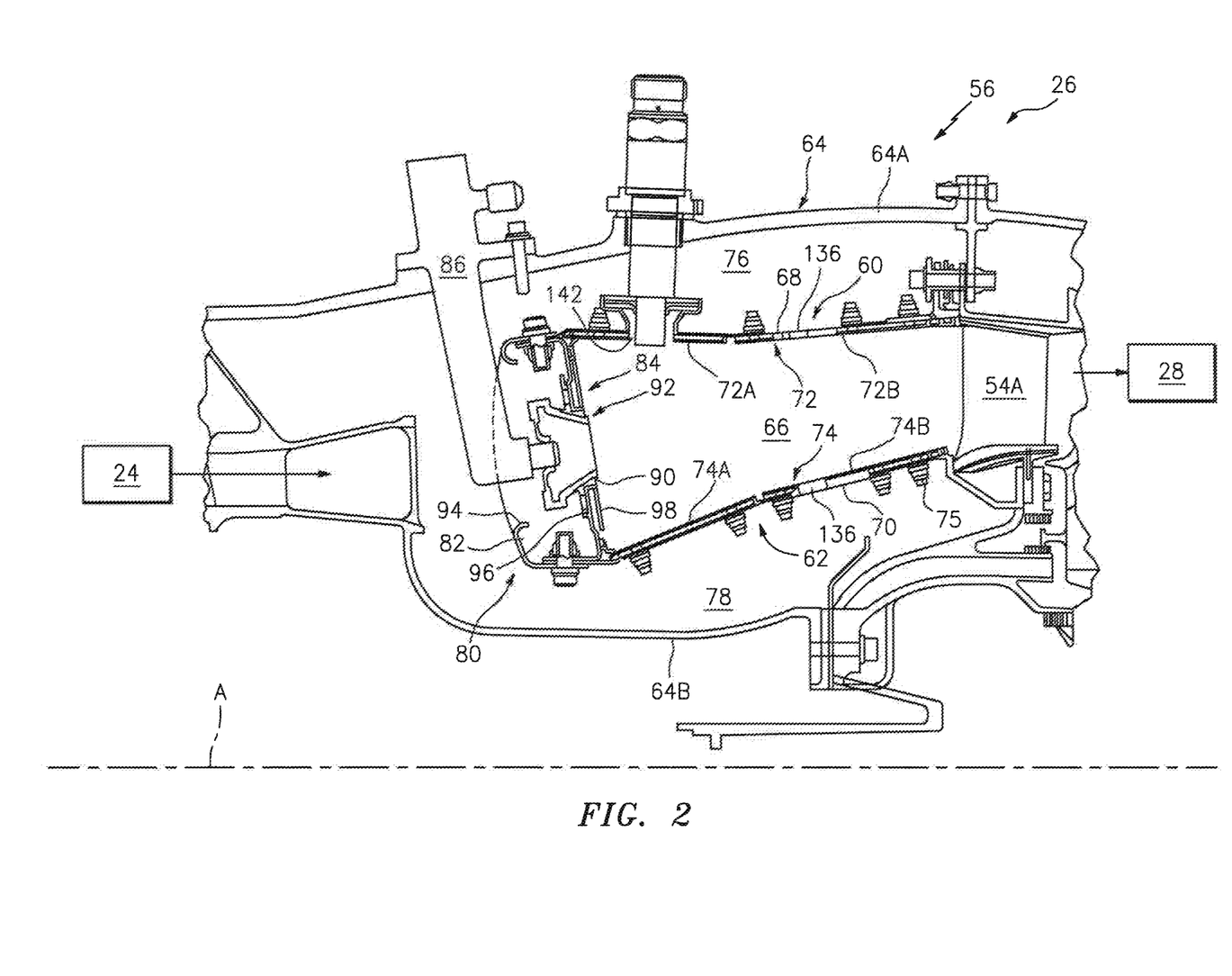
FIG. 2 is a cross-section of a combustor section.

With reference to FIG. 2, the combustor section 26 generally includes a combustor 56 with an outer combustor wall assembly 60, an inner combustor wall assembly 62 and a diffuser case module 64 that encases assemblies 60, 62. The outer combustor wall assembly 60 and the inner combustor wall assembly 62 are radially spaced apart such that an annular combustion chamber 66 is defined therebetween.

The outer combustor wall assembly 60 is spaced radially inward from an outer diffuser case 64A of the diffuser case module 64 to define an outer annular plenum 76. The inner combustor wall assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit. It should be further understood that the disclosed cooling flow paths are but an illustrated embodiment and should not be limited.

The combustion chamber 66 contains the combustion products that flow axially toward the turbine section 28. Each combustor wall assembly 60, 62 generally includes a respective support shell 68, 70 that supports one or more liners 72, 74 mounted thereto. Each of the liners 72, 74 may be formed of a plurality of floating heat shields or panels that are generally rectilinear and manufactured of, for example, a nickel based super alloy that may be coated with a ceramic, or other temperature resistant material, and are arranged to form a liner array. Each liner may have a plurality of forward panels 72A and a plurality of aft panels 72B that line the outer shell 68. A plurality of forward panels 74A and a plurality of aft panels 74B also line the inner shell 70. It should be appreciated that the liner array may alternatively include but a single panel rather than the illustrated axial forward and axial aft panels.

The combustor 56 further includes a forward assembly immediately downstream of the compressor section 24 to receive compressed airflow therefrom. The forward assembly 80 generally includes an annular hood 82, a bulkhead assembly 84, and a plurality of swirlers 90 (one shown). Each of the swirlers 90 is circumferentially aligned with one of a plurality of fuel nozzles 86 (one shown) and a respective one of a plurality of hood ports 94. The bulkhead assembly 84 includes a bulkhead support shell 96 secured to the combustor walls 60, 62, and a plurality of circumferentially distributed bulkhead heat shields or panels 98 secured to the bulkhead support shell 96 around each of a respective swirler opening 92. The bulkhead support shell 96 is generally annular and the plurality of circumferentially distributed bulkhead panels 98 are segmented, typically one to each fuel nozzle 86 and swirler 90.

The annular hood 82 extends radially between, and is secured to, the forwardmost ends of the combustor wall assemblies 60, 62. Each one of the plurality of circumferentially distributed hood ports 94 receives a respective one of the plurality of fuel nozzles 86 and facilitates the direction of compressed air into the forward end of the combustion chamber 66 through the swirler opening 92. Each fuel nozzle 86 may be secured to the diffuser case module 64 and projects through one of the hood ports 94 into the respective swirler opening 92.

The forward assembly 80 introduces core combustion air into the forward section of the combustion chamber 66 while the remainder enters the outer annular plenum 76 and the inner annular plenum 78. The plurality of fuel nozzles 86 and adjacent structure generate a blended fuel-air mixture that supports stable combustion the combustion chamber 66.

Opposite the forward assembly 80, the outer and inner support shells 68, 70 may be mounted adjacent to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 3:
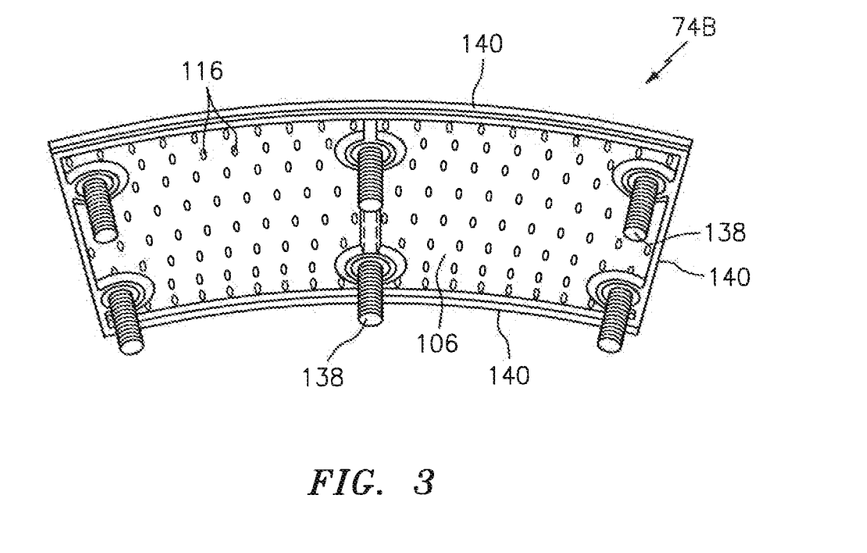
FIG. 3 is a perspective view of a panel of a liner of the combustor section.
Figure 4:
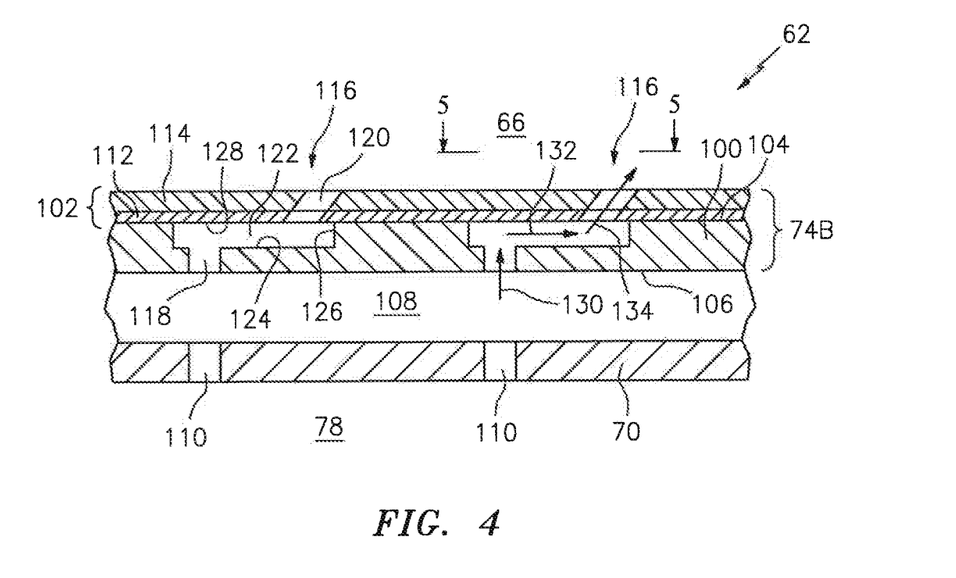
FIG. 4 is a cross section of a combustor wall assembly of the combustor section illustrating film cooling circuits.

Referring to FIGS. 3 and 4, the inner liner 74 and inner shell 70 of the inner wall assembly 62 is illustrated to show one, non-limiting, embodiment of the disclosure; however, it is understood that the same teachings may apply to the outer wall assembly 60. The heat shield or panel 74B of liner 74 has a generally planar panel substrate 100 covered by a thermal barrier coating 102 that defines a boundary of the annular combustion chamber 66. The substrate 100 has a hot or first face 104 covered and thermally protected by the coating 102, and an opposite cold or second face 106. An annular cooling cavity 108 of wall assembly 62 is radially defined between the cold side 106 of liner 74 and the shell 70 for generally receiving cooling air from the inner plenum 78 via a plurality of holes 110 (that may be impingement holes) in the shell. Air flowing through the holes 110 may impinge upon the cold face 106 of liner 74.

The coating 102 may include a bond coat 112 secured directly to the first face 104 of the substrate 100, and a thermal barrier coat 114 that covers the bond coat 112 and is directly exposed to the combustion chamber 66. The substrate 100 may be made of a nickel-based super alloy, such as PWA 1455, or other suitable super alloys capable of withstanding elevated temperatures. Other materials and/or processes may include equiax, directionally-solidified single crystal castings, metal powder or forged materials, composites, ceramics and hybrid combinations thereof. The bond coat 112 may be associated with a thermal, corrosion prevention and/or environmental coating system; may be made of any variety of materials including nickel, cobalt, chromium, aluminum, and others; and, may be applied to the substrate via plating, plasma spray, electron beam, vapor deposition cathodic arc, sputtering, or other means. The thermal barrier coat 114 may be one or more layers and may be made of ceramic based materials and/or any combination of yttria, zirconium and others. It is further contemplated and understood that the bond coat may be any coat and not necessarily needed for bonding of the thermal barrier coat. For instance, the coat 112 may be made of the same material as the substrate 100.

The bond coat 112 may have a thickness within the range of 0.002 inches to 0.010 inches (0.051 millimeters to 0.254 millimeters) and preferably within the range of 0.007 inches to 0.010 inches (0.178 millimeters to 0.254 millimeters) to facilitate structural integrity. The thermal barrier coat 114 may have a thickness within the range of 0.005 inches to 0.050 inches (0.127 millimeters to 1.27 millimeters).

The panel 74B of liner 74 further includes a plurality of film cooling circuits 116 for flowing cooling air from the cavity 108, through the panel 74B and into the combustion chamber 66 for generally forming a film of cooling air over the thermal coat 114 for additional thermal protection from the hot combustion gases. The film cooling circuit 116 has an aperture 118, a film cooling hole 120 and a channel 122 in fluid communication between the aperture 118 and the hole 120. The channel 122 is generally in the substrate 100, and is defined by a bottom surface 124 of the substrate 100 that generally faces toward the combustion chamber 66, a continuous, peripheral, side 126 of the substrate 100 that spans between the surface 124 and the hot face 104 and surrounds the bottom surface 124, and a portion 128 of the bond coat 112 of the coating 102 that spans above or over the channel 122.

Figure 5:
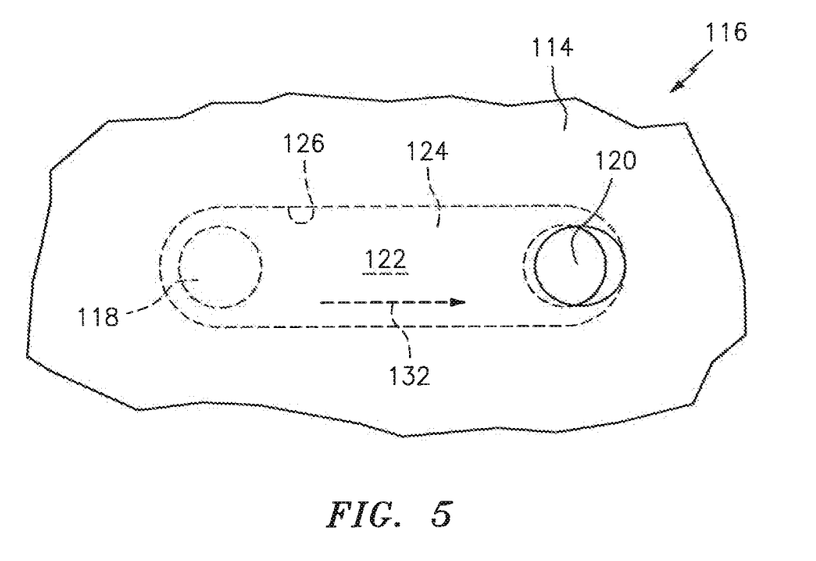
FIG. 5 is a partial plan view of the panel.

Referring to FIGS. 4 and 5, the aperture 118 of the film cooling circuit 116 is in and defined by the substrate 100, and extends through the cold face 106 and the bottom surface 124 to communicate directly between the cavity 108 and the channel 122. The hole 120 is in and defined by the coating 102 and extends through the bond coat 112 and the thermal coat 114 to communicate directly between the channel 122 and the combustion chamber 66. The aperture 118 is generally offset from the hole 120. That is, the aperture 118 may communicate with one end of the channel 122 and the hole 120 may communicate with an opposite end of the channel. The orientations of the aperture 118, the channel 122 and the hole 120 are such that a direction of flow (see arrow 130) in the aperture 118 may be substantially normal to a direction of flow (see arrow 132) in the channel 122, and a direction of flow (see arrow 134) in the hole 120 may be angled with respect to the direction of flow 132. The direction of flow 134 may be angled by about thirty degrees to enhance the formation of a film of cooling air across the thermal barrier coat 114. It is further contemplated and understood that this angle may be within a range of about twenty degrees to ninety degrees depending upon a particular location and cooling need.

Although the cooling circuit 116 may be located anywhere on the panel 74B, location of the circuit near or about specific areas of the panel that are difficult to cool through more traditional film cooling holes, may be particularly advantageous. Such areas may include dilution holes and/or associated grommets 136, panel structural support studs 138, peripheral panel rims 140, and igniter holes 142 (see FIGS. 2 and 3). Moreover, the panel 74B application may not be limited to the liner(s) 72, 74 but may also include the bulkhead panels 98.

Figure 6:
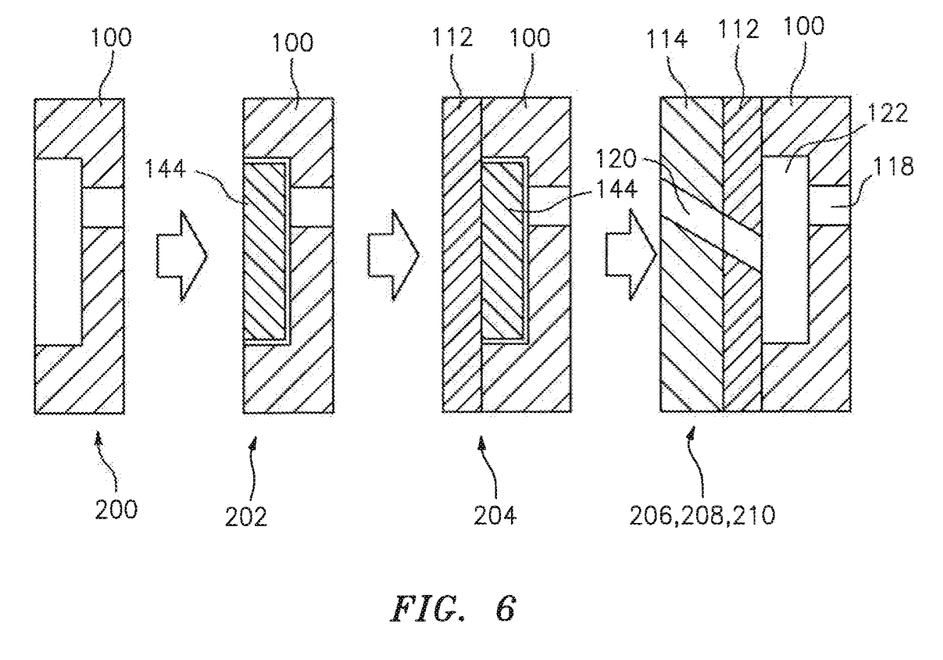
FIG. 6 is a series of cross sections of the film cooling circuit during various stages of manufacturing.
Figure 7:
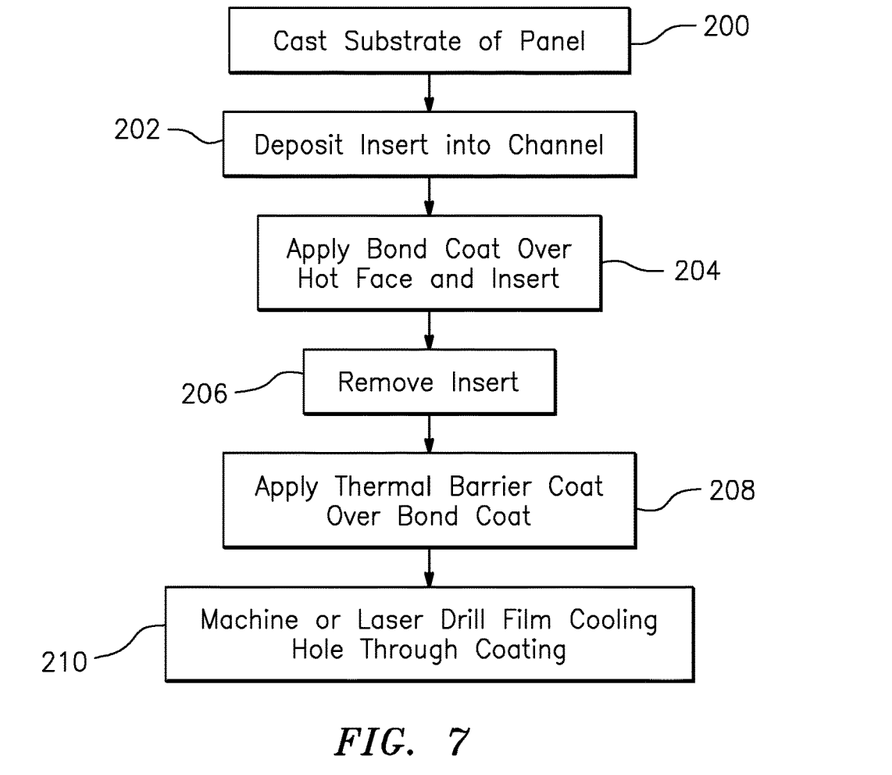
FIG. 7 is a flow chart of a manufacturing method of the film cooling circuit.

Referring to FIGS. 6 and 7, a method of manufacturing the film cooling circuit 116 is generally illustrated. As step 200, the substrate 100 of the panel 74B may be cast by conventional means with the aperture 118 and the channel 122 cast into the substrate. As step 202, a sacrificial insert 144 (e.g. wax and/or masking) may be placed into the channel 122. As step 204, the bond coat 112 may be placed over the hot face 104 of the substrate 100 and the insert 144 via metal coating or plating. As step 206, the insert 144 may be removed through the aperture 118 by conventional means. As step 208, the thermal barrier coat 114 may be added over the bond coat 112 via plasma spray or a deposition method as two, non-limiting, examples. As a final step 210, the film hole 120 may be laser drilled through the coats 112, 114 or machined by other mechanical means. It is further contemplated and understood that the cooling circuit 116, or any portion thereof, may be manufactured by other methods such as additive manufacturing. It is further contemplated and understood that removal of the insert 144 may be achieved through the film cooling holes or a combination of the holes and apertures.

Figure 8:
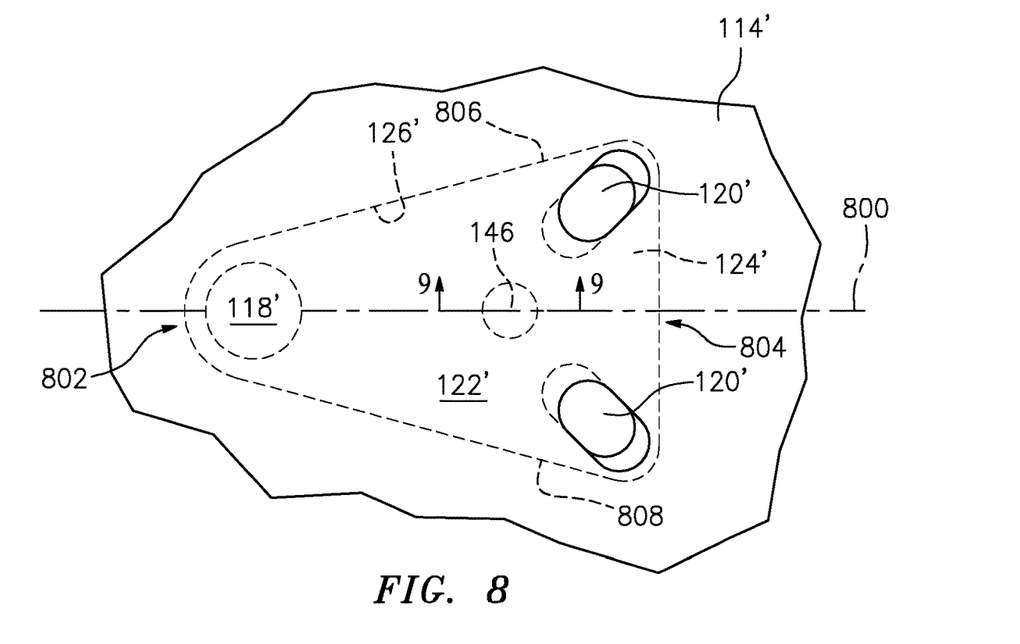
FIG. 8 is a partial plan view of a panel illustrating a second embodiment of a film cooling circuit.
Figure 9:
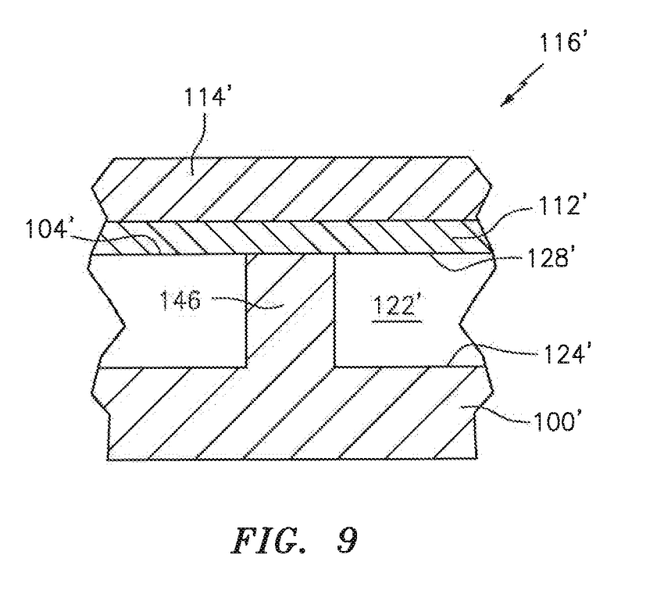
FIG. 9 is a partial cross section of e film cooling circuit taken along line 9-9 of FIG. 8.

Referring to FIGS. 8 and 9, a second embodiment of a film cooling circuit is illustrated wherein like elements have like identifying numerals except with the addition of a prime symbol. The circuit 116' of the second embodiment has an aperture 118', a plurality of film cooling holes 120' (two illustrated as one, non-limiting, example) and a channel 122' in fluid communication between the aperture 118' and the holes 120'. The channel 122' is generally in a substrate 100', and is defined by a bottom surface 124' of the substrate 100' that generally faces toward a combustion chamber, a continuous, peripheral, side 126' of the substrate 100' that spans between the bottom surface 124' and a hot face 104' of the substrate 100' and surrounds the surface 124', and a portion 128' of a bond coat 112' of a coating 102' that spans above or over the channel 122'. The channel 122' includes a channel centerline 800 extending between an upstream end 802 and a downstream end 804 of the channel 122'. The aperture 118' may be disposed between the upstream end 802 and the downstream end 804 of the channel 122' along the channel centerline 800. The peripheral side 126' of the substrate 100' defines a first side 806 of the channel 122', extending between the upstream end 802 and the downstream end 804 of the channel 122', and a second side 808 of the channel 122' opposite the first side 806 and also extending between the upstream end 802 and the downstream end 804 of the channel 122'. The channel 122' may have a width between the first side 806 and the second side 808 at the downstream end 804 of the channel 122' that is greater than a width between the first side 806 and the second side 808 at the upstream end 804 of the channel 122'.

The circuit 116' may further include a stanchion or pedestal 146 that contacts and spans between the bottom surface 124' and the portion 128' of the bond coat 112' for providing additional bond coat support. The pedestal 146 may be disposed between the upstream end 802 and the downstream end 804 of the channel 122' along the channel centerline 800. Accordingly, as shown in FIG. 8, the pedestal 146 may be disposed between the aperture 118' and the holes 120' with respect to the channel centerline 800. A first hole of the holes 120' may be disposed between the channel centerline 800 and the first side 806 of the channel 122' while a second hole of the holes 120' may be disposed between the channel centerline 800 and the second side 808 of the channel 122'. The pedestal 146 may generally be any shape that provides sufficient structural integrity and may further be shaped to guide and distribute cooling air flow from the aperture 118' and to the holes 120'. The pedestal 146 may further be cast as one unitary piece with the substrate 100'; machined, or later added in a manufacturing operation. It is further contemplated and understood that more than one pedestal 138 may be added for additional structural support and/or flow distribution. It is further contemplated and understood that the pedestal s 146 may further be a pin, a wall, or any variety of other structural shapes. Such shapes, or portions thereof, may only facilitate flow distribution, and thus may project from the bottom surface 124' but may fall short of and do not connect to the bond coat 112'.

It is understood that relative positional terms such as "forward," "aft," "upper," "lower," "above," "below," and the like are with reference to the normal operational attitude and should not be considered otherwise limiting. It should be understood that like reference numerals identify corresponding or similar elements throughout the several drawings. It should also be understood that although a particular component arrangement is disclosed in the illustrated embodiment, other arrangements will benefit therefrom. Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A combustor liner comprising:
   a substrate having a first surface configured to face a combustion chamber and a second surface opposite the first surface;
   a coating disposed over the first surface of the substrate, the coating having a first surface and a second surface opposite the first surface, the second surface of the coating in contact with the first surface of the substrate;

wherein the substrate includes at least one channel disposed in the substrate, the at least one channel having an inner surface, defined by a third surface of the substrate disposed between the first surface and the second surface, an outer surface defined by the second surface of the coating, and a peripheral surface extending between the inner surface and the outer surface and wherein the at least one channel includes an impingement hole extending between the second surface of the substrate and the inner surface of the at least one channel and a first film cooling holes and a second film cooling hole extending between the outer surface of the at least one channel and the first surface of the coating; and wherein the coating includes a bond coat covering the first surface of the substrate; and a pedestal disposed in the at least one channel, the pedestal extending between and engaged to the inner surface of the at least one channel and the coating, the pedestal configured to provide support for the bond coat of the coating;

wherein the first film cooling hole has a first direction of flow that is different than a second direction of flow of the second film cooling hole;

wherein the at least one channel includes a channel centerline extending between an upstream end and a downstream end of the at least one channel and wherein the impingement hole and the pedestal are disposed along the channel centerline; and wherein the peripheral surface defines a first side of the at least one channel, extending between the upstream end and the downstream end, and a second side of the at least one channel opposite the first side and extending between the upstream end and the downstream end and wherein a first width between the first side and the second side at the downstream end of the at least one channel is greater than a second width between the first side and the second side at the upstream end of the at least one channel.

2. The combustor liner set forth in claim 1, wherein the coating includes a thermal barrier coat covering the bond coat.

3. The combustor liner set forth in claim 1, wherein the first direction of flow and the second direction of flow are different than a third direction of flow of the impingement hole.

4. The combustor liner set forth in claim 3, wherein the impingement hole is disposed at the upstream end of the at least one channel and the first film cooling holes and the second film cooling hole are disposed at the downstream end of the at least one channel.

5. The combustor liner set forth in claim 1, wherein the pedestal is disposed between the impingement hole and the first and second film cooling holes with respect to the channel centerline.

6. The combustor liner set forth in claim 5, wherein the first film cooling hole is disposed between the channel centerline and the first side of the at least one channel and the second film cooling hole is disposed between the channel centerline and the second side of the at least one channel and wherein the pedestal is configured to guide and distribute cooling air from the impingement hole to the first and second film cooling holes.

7. A combustor wall assembly comprising:
a shell; and a combustor liner mounted to the shell with a cooling cavity defined between the combustor liner and the shell, the combustor liner comprising:
a substrate having a first surface configured to face a combustion chamber and a second surface opposite the first surface; and
a coating disposed over the first surface of the substrate, the coating having a first surface and a second surface opposite the first surface, the second surface of the coating in contact with the first surface of the substrate;
wherein the substrate includes at least one channel disposed in the substrate, the at least one channel having an inner surface, defined by a third surface of the substrate disposed between the first surface and the second surface, an outer surface defined by the second surface of the coating, and a peripheral surface extending between the inner surface and the outer surface and wherein the at least one channel includes an impingement hole extending between the second surface of the substrate and the inner surface of the at least one channel and a first film cooling holes and a second film cooling hole extending between the outer surface of the channel and the first surface of the coating; and
wherein the coating includes a bond coat covering the first surface of the substrate; and
a pedestal disposed in the at least one channel, the pedestal extending between and engaged to the inner surface of the at least one channel and the coating, the pedestal configured to provide support for the bond coat of the coating;
wherein the first film cooling hole has a first direction of flow that is different than a second direction of flow of the second film cooling hole;
wherein the at least one channel includes a channel centerline extending between an upstream end and a downstream end of the at least one channel and wherein the impingement hole and the pedestal are disposed along the channel centerline; and
wherein the peripheral surface defines a first side of the at least one channel, extending between the upstream end and the downstream end, and a second side of the at least one channel opposite the first side and extending between the upstream end and the downstream end and wherein a first width between the first side and the second side at the downstream end of the at least one channel is greater than a second width between the first side and the second side at the upstream end of the at least one channel.

8. The combustor wall assembly set forth in claim 7, wherein the at least one channel is configured to receive cooling air through the impingement hole and direct the cooling air through the first film cooling holes and the second film cooling hole.

9. The combustor wall assembly set forth in claim 7, wherein the coating includes a thermal barrier coat covering the bond coat.

10. The combustor wall assembly set forth in claim 9, wherein at least one of the first film cooling holes and the second film cooling hole is a laser drilled hole.

11. The combustor wall assembly set forth in claim 7, wherein the pedestal is disposed between the impingement hole and the first and second film cooling holes with respect to the channel centerline.

12. The combustor wall assembly set forth in claim 11, wherein the first film cooling hole is disposed between the channel centerline and the first side of the at least one channel and the second film cooling hole is disposed between the channel centerline and the second side of the at least one channel and wherein the pedestal is configured to guide and distribute cooling air from the impingement hole to the first and second film cooling holes.

* * * * *